Feb. 27, 1962 H. H. WALLER 3,023,370

VARIABLE FREQUENCY GENERATOR CONTROL CIRCUIT

Filed Nov. 25, 1959

INVENTOR
HERBERT H. WALLER
BY Mitchell & Bechert
ATTORNEY

United States Patent Office 3,023,370 Patented Feb. 27, 1962

3,023,370
VARIABLE FREQUENCY GENERATOR CONTROL CIRCUIT

Herbert H. Waller, Hicksville, N.Y., assignor to Servo Corporation of America, New Hyde Park, N.Y., a corporation of New York Filed Nov. 25, 1959, Ser. No. 855,315
4 Claims. (Cl. 331—11)

Figure 1:
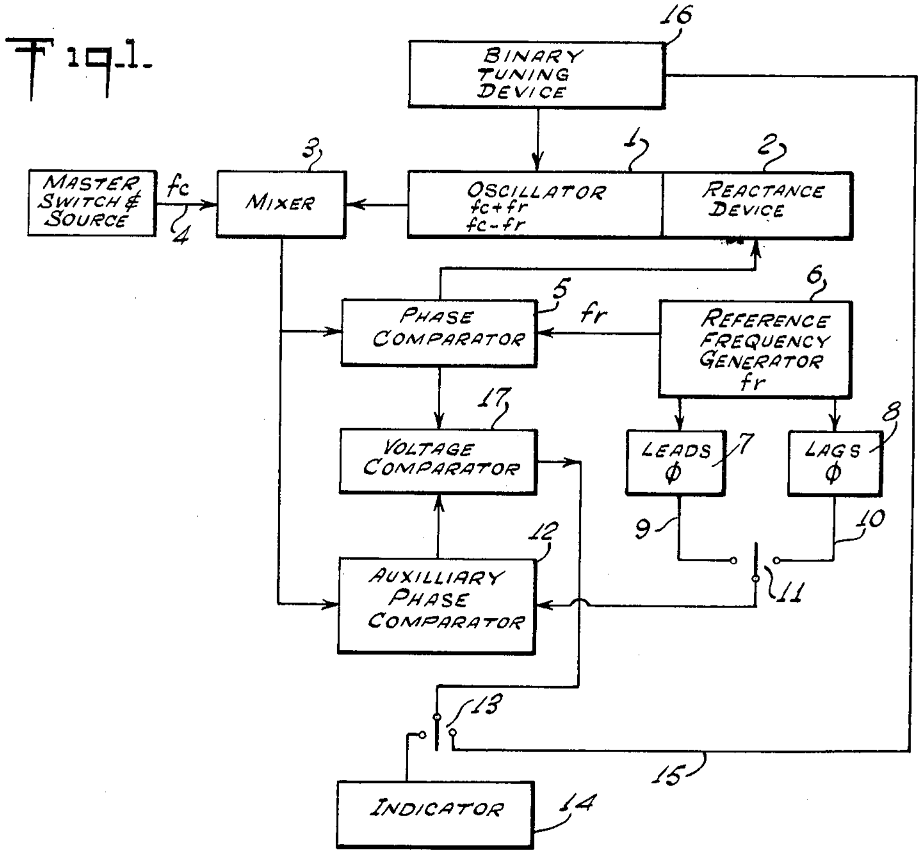

This invention relates to variable frequency generator control circuits and more particularly to a sideband selector circuit for use in combination with a phase locked servo loop circuit controlling the frequency of the output of a variable frequency signal source.

In many electronic information systems such as radio navigation aids, it is often necessary to generate a signal having a frequency characteristic which differs by a constant amount from a signal from a primary signal source. For example, in one type of omnirange system a reference signal is generated at a constant frequency difference from the reference signal. The comparison signal is effectively rotated and a measurement, at a remote location, of the phase of the rotated signal relative to the reference signal provides an indication of the azimuth of the remote location relative to the signal sources.

In such systems, it is essential that the frequency difference between the radiated signals be held constant in spite of transmitter drift or other effects tending to affect the stability of either of the signal sources. In such systems, one of the signal sources is made variable and may be "slaved" to the other or "master" signal source in order to maintain the desired "offset" or constant frequency difference separation. Since the "slaved" signal source can normally produce a signal having a frequency above or below the frequency of the "master" signal source, it has been found desirable to limit the frequency range of the "slaved" signal source so that its output contains only the upper or lower sideband but not both. The necessity of so limiting the signal source has required the addition of circuitry and an accompanying increase in complexity and cost.

One of the objects of this invention, therefore, is to provide a variable frequency generator, operating in a phase locked servo loop to maintain a constant frequency separation from an input signal, capable of selectively operating in either sideband.

Another object of this invention is to provide a circuit capable of providing a signal indicative of the sideband to which a variable frequency generator is locked.

A feature of this invention is to provide in combination with a frequency generator a control circuit in which the output of a variable frequency generator is mixed with an input signal to produce a difference signal which is compared in phase with the output of a reference signal generator to provide a signal which adjusts the variable frequency generator output to maintain it at a constant frequency separation relative to the input signal, means to generate a signal indicative of the tuning of the variable frequency generator, comprising an auxiliary reference signal source differing in phase from said reference signal and comparing the phase of the auxiliary reference signal with the difference signal to produce the indicating signal.

Figure 2:
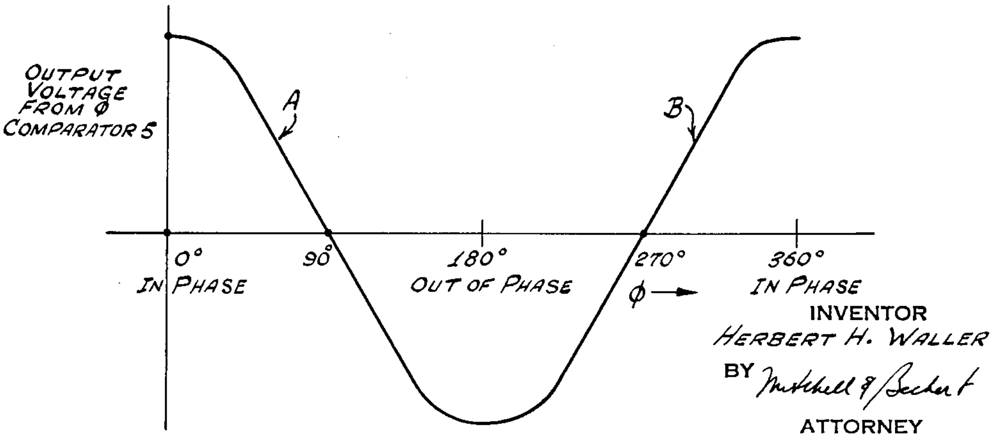

The above-mentioned and other objects and features of this invention will become more apparent by reference to the following description taken in conjunction with the accompanying drawing, in which:

FIG. 1 is a block diagram of the novel control circuit for a variable frequency generator; and FIG. 2 is a diagram of the voltage phase relationship of a discriminator shown in FIG. 1.

Referring to the drawing, a variable frequency generator control circuit, in accordance with the principles of this invention, comprises an oscillator 1 capable of generating signals over a range of frequencies. In accordance with well known engineering principles, a reactance control device 2 is associated with the oscillator 1, to adjust the frequency of the signal output thereof. The output of the oscillator 1 is coupled to a mixer 3. A signal $f_c$ from a "master" signal source is coupled, as the other input, to the mixer 3 over line 4.

The control circuit "slaves" the frequency output of the oscillator 1 to the "master" signal source to maintain a constant frequency difference between the signals. The mixer 3 develops a signal output proportional to the difference in frequency between the "master" and "slave" signal sources. The output of the mixer 3 is coupled to a phase comparator circuit 5 along with a reference signal from a reference signal source 6. The reference signal generator 6 produces an output signal having a frequency equal to the desired frequency separation between the "master" and "slave" signal sources. The phase comparator output signal is proportional to the phase difference between the output signals from mixer 3 and the reference signal generator 6.

In order to provide a frequency stable reference signal, it has been found expedient to utilize a crystal oscillator as the reference signal source 6. The output of the phase comparator 5, having a polarity and amplitude indicative of the difference in phase between the output of the mixer 3 and the reference signal from source 6, is coupled as a control signal to cause the reactance control 2 to adjust the frequency of the signals from the signal source 1 to maintain the desired frequency difference relative to the input signals coupled over line 4. Thus, the circuitry described above constitutes a phase locked servo loop controlling the frequency of the output of the signal generator 1 relative to the frequency of the input signals coupled over line 4 from a remote signal source.

In order to determine or select the sideband to which the oscillator 1 is tuned, an auxiliary reference signal is provided which differs in phase from the output of the reference signal source 6. To provide the auxiliary reference signal, two outputs from the reference signal source 6 are coupled through phase shift circuits 7 and 8 respectively. The output of phase shift circuits 7 is coupled over line 9 and leads in phase the output of the reference signal source 6 while the output of the phase shift circuit 8 coupled over line 10 lags in phase the output of the reference signal generator 6. The outputs coupled over lines 9 and 10 are selectively coupled by switch 11 to an auxiliary phase comparator circuit 12. The other input to the auxiliary phase comparator 12 comprises the signal output from mixer 3. The output of the auxiliary phase comparator 12 and the output of phase comparator 5 are coupled to a voltage comparator 17 producing a sum or difference voltage. The output voltage is applied over a switch 13 to an indicating device 14 and/or over line 15 to a binary tuning control device 16, the output of which causes the oscillator 1 to be tuned to the frequency of either the upper or lower sideband. Tuning may be accomplished by employing a reversible motor in the binary tuner. The motor responds to the sum or difference volatge produced by the voltage comparator 17, dependent on the frequency of the sideband involved, and acts on the oscillator 1 to adust the frequency of oscillation. The voltage, which is coupled over the line 15 to the binary tuner 16, is sufficient to overcome the hold of the automatic frequency control loop, comprising the oscillator 1, mixer 3, phase comparator 5 and reactance device 2, thereby tuning oscillator 1 to produce the desired upper or lower frequency.

In operation, the ouput of the reference signal generator 6 is a signal $f_r$ which is equal in frequency to the offset frequency or the desired difference in frequency between the "master" signal coupled over line 4 and the frequency of the output of oscillator 1. Thus, if the frequency of the signal coupled over line 4 is $f_c$, the desired frequency output of the oscillator 1 is $f_c+f_r$ or $f_c-f_r$. Either of these outputs from the oscillator 1 will be at the desired offset frequency from the input signal frequency $f_c$.

For purposes of understanding the novel circuit which produces an indication of the sideband which is being utilized, it is useful to assume that "frequency lock" exists; i.e. that oscillator 1 is injecting into mixer 3 a frequency differing from $f_c$ by $f_r$, and to examine what occurs as either signal source tends to drift and thus upset the equilibrium.

Assuming that oscillator 1 is injecting a frequency $f_c+f_r$ into mixer 3, a difference frequency $f_r$ will then in turn be fed out of the mixer into phase comparator 5. Phase comparator 5 is also fed a frequency $f_r$ from frequency reference generator 6. The two signals fed to phase comparator 5 are thus assumed to be of equal frequency. The output of phase comparator 5 will have an output voltage proportional to the phase difference between the two signals fed to it. The output voltage from the phase comparator is assumed accurately to tune the reactance device 2 to cause the oscillator 1 to generate the assumed frequency $f_c+f_r$.

The above assumed condition is a stable one. This can be understood by examining what occurs as one of the signal sources tends to drift. Say oscillator 1 starts to shift its phase from the state of equilibrium in a direction of increasing frequency. The output from mixer 3 will then also start to shift its phase in a direction of increasing frequency (for the assumed condition of oscillator 1 output being $f_c+f_r$ rather than $f_c-f_r$). The opposite would be true if oscillator 1 had an output frequency less than $f_c$.

The resultant change is sensed by the phase comparator 5 which produces a voltage in a direction to decrease the frequency. As a result, a new equilibrium is established and a different voltage is required on the reactance tube to tune the oscillator 1 to the desired frequency $f_c+f_r$ The voltage-phase relationship of the phase discriminator 5 is illustrated in FIG. 2. If the particular reactance device is of a type to increase the frequency of oscillator 1 with more positive voltage and decrease frequency with more negative voltage, the state of equilibrium previously discussed exists along slope A where advance in phase produces a more negative voltage. Slope A represents a phase between the mixer 3 output and the reference $f_r$, which is at or near 90°.

It can be similarly demonstrated that with oscillator 1 set for the lower sideband ($f_c-f_r$) a state of equilibrium will exist along slope B; i.e. on or near 270°.

The voltage-phase diagram also can be used to explain the operation of the auxiliary phase comparator. Depending on whether operation is taking place along slope A (upper sideband $f_c+f_r$) or slope B (lower sideband $f_c-f_r$), an advance in phase with respect to the output of the reference generator 6 will produce a more negative voltage (slope A) or a more positive voltage (slope B) out of the auxiliary phase comparator 12 as compared to the output of phase comparator 5. An advance in phase is produced by connecting the auxiliary phase comparator 12 to the lagging reference signal on lead 10.

Similarly, a retardation in phase is produced by connecting the comparator 12 to a leading reference signal on lead 9 and will result in a more postive output from the comparator 12 than from the phase comparator 5 for slope A operation, and opposite for slope B operation.

The voltage relationship at the outputs of phase comparators 5 and 12 is determined in a voltage comparator 17 and displayed in indicator 14 or used to operate a binary tuning device 16.

Thus, the relative value of the voltage from the phase comparator 12 as compared with the output from the comparator 5 indicates which sideband is being utilized in the system. For example, an output from the comparator 5 may be one volt. If it is assumed that operation is along slope A ($f_c+f_r$) and switch 11 is connected to the phase lagging circuit 8 the output from the auxiliary phase comparator may be −5 volts. The difference of the two phase comparator outputs would then be −6 volts. If, however, operation had been along slope B, the output from comparator 12 would be +7 volts and the difference of the two voltages would be +6 volts. Knowledge of which phase-shifting circuit, 7 or 8, is connected to the auxiliary comparator 12, and knowledge of the polarity of the output voltage from voltage comparator 17, are sufficient to determine which sideband is being utilized.

The output from the tuning device 16 may then be used to tune the oscillator to the desired sideband.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. A circuit for determining the sideband of a frequency generator, comprising a source of energy having a predetermined frequency, a generator producing energy having a frequency equal to said predetermined frequency plus or minus a sideband frequency, a mixer coupled to the outputs of said source and said generator for producing an output having a frequency equal to said sideband frequency; and means for determining whether said sideband is the upper or lower sideband of said predetermined frequency, comprising a reference generator producing energy at said sideband frequency, a first phase comparator coupled to the outputs of said mixer and said reference generator and producing a signal indicative of the phase difference between the applied inputs, a phase-shifting means coupled to the output of said reference generator, a second phase comparator coupled to the outputs of said mixer and said phase-shifting means, said phase-shifting means shifting the phase of said sideband sufficiently so that the output of said second phase comparator differs in magnitude substantially depending on whether the output from said mixer is the upper or lower sideband, and comparator means coupled to the outputs of said first and second phase comparators for relating the inputs applied thereto, and producing an output indicative of the sideband.

2. The circuit according to claim 1 which further includes indicator means coupled to said comparator means for providing an indication of the sideband.

3. The circuit according to claim 1 wherein said phase shifting means comprises a first means for advancing the phase of the reference generator output, a second means for retarding the phase of the reference generator output, and a switch to selectively couple either of said first or second means between said reference generator and said second phase comparator, whereby the output from said second phase comparator is determined by the sideband and by the nature of the phase-shifted reference energy.

4. The circuit according to claim 3 and further comprising a tuning device coupled to the output of said comparator means and to the input of said generator means, said tuning device responding to the output of said comparator means to control the operation of said generator so that said generator operates at the desired sideband.

No references cited.